United States Patent
Golla et al.

(10) Patent No.: US 7,330,988 B2
(45) Date of Patent: Feb. 12, 2008

(54) METHOD AND APPARATUS FOR POWER THROTTLING IN A MULTI-THREAD PROCESSOR

(75) Inventors: Robert T. Golla, Round Rock, TX (US); Ricky C. Hetherington, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 427 days.

(21) Appl. No.: 10/881,092

(22) Filed: Jun. 30, 2004

(65) Prior Publication Data

US 2006/0020831 A1   Jan. 26, 2006

(51) Int. Cl.
G06F 1/00 (2006.01)
G06F 9/30 (2006.01)

(52) U.S. Cl. .............. 713/322; 713/340; 712/216
(58) Field of Classification Search ........ 713/300, 713/320, 322, 340; 712/216, 219; 714/31; 710/47–48, 260–264

See application file for complete search history.

(56) References Cited

U.S. PATENT DOCUMENTS

| | | | |
|---|---|---|---|
| 5,046,068 A | 9/1991 | Kubo et al. | |
| 5,257,215 A | 10/1993 | Poon | |
| 5,339,266 A | 8/1994 | Hinds et al. | |
| 5,386,375 A | 1/1995 | Smith | |
| 5,490,059 A | 2/1996 | Mahalingaiah et al. | |
| 5,491,829 A | 2/1996 | Kau et al. | |
| 5,515,308 A | 5/1996 | Karp et al. | |
| 5,539,681 A | 7/1996 | Alexander et al. | |
| 5,546,593 A | 8/1996 | Kimura et al. | |
| 5,619,439 A | 4/1997 | Yu et al. | |
| 5,652,894 A * | 7/1997 | Hu et al. ............ | 713/322 |
| 5,742,832 A | 4/1998 | Buxton et al. | |
| 5,764,524 A | 6/1998 | Andersson et al. | |
| 5,805,907 A | 9/1998 | Loper et al. | |
| 5,887,178 A | 3/1999 | Tsujimoto et al. | |
| 5,951,689 A | 9/1999 | Evoy et al. | |
| 5,954,789 A | 9/1999 | Yu et al. | |
| 5,996,083 A * | 11/1999 | Gupta et al. ......... | 713/322 |
| 6,029,006 A | 2/2000 | Alexander et al. | |
| 6,076,157 A | 6/2000 | Borkenhagen et al. | |
| 6,081,901 A | 6/2000 | Dewa et al. | |
| 6,088,788 A | 7/2000 | Borkenhagen et al. | |
| 6,088,800 A | 7/2000 | Jones et al. | |
| 6,105,127 A | 8/2000 | Kimura et al. | |

(Continued)

OTHER PUBLICATIONS

International Search Report and Written Opinion for PCT/US2005/023415, mailed Nov. 2, 2005, 13 pages.

(Continued)

*Primary Examiner*—Suresh K Suryawanshi
(74) *Attorney, Agent, or Firm*—Meyertons Hood Kivlin Kowert & Goetzel, P.C.; Robert C. Kowert; Rory D. Rankin

(57) ABSTRACT

A method and apparatus for controlling power consumption in a processor. In one embodiment, a processor includes a pipeline. The pipeline includes logic for fetching instructions, issuing instructions, and executing instructions. The processor also includes a power management unit. The power management unit is configured to input M stalls into the pipeline every N instruction cycles (where M and N are integer value and wherein M is less than N).

30 Claims, 8 Drawing Sheets

U.S. PATENT DOCUMENTS

| | | | |
|---|---|---|---|
| 6,131,104 A | 10/2000 | Oberman | |
| 6,138,232 A | 10/2000 | Shiell et al. | |
| 6,182,203 B1 | 1/2001 | Simar et al. | |
| 6,202,172 B1* | 3/2001 | Ponte | 714/31 |
| 6,212,544 B1 | 4/2001 | Borkenhagen et al. | |
| 6,219,723 B1 | 4/2001 | Hetherington et al. | |
| 6,237,101 B1 | 5/2001 | Moore et al. | |
| 6,282,554 B1 | 8/2001 | Abdallah et al. | |
| 6,304,978 B1 | 10/2001 | Horigan et al. | |
| 6,308,260 B1 | 10/2001 | Le et al. | |
| 6,341,347 B1 | 1/2002 | Joy et al. | |
| 6,349,319 B1 | 2/2002 | Shankar et al. | |
| 6,357,016 B1 | 3/2002 | Rodgers et al. | |
| 6,367,023 B2* | 4/2002 | Kling et al. | 713/340 |
| 6,397,239 B2 | 5/2002 | Oberman et al. | |
| 6,415,308 B1 | 7/2002 | Dhablania et al. | |
| 6,427,196 B1 | 7/2002 | Adiletta et al. | |
| 6,430,678 B1 | 8/2002 | Kahle et al. | |
| 6,434,699 B1 | 8/2002 | Jones et al. | |
| 6,496,925 B1 | 12/2002 | Rodgers et al. | |
| 6,507,862 B1 | 1/2003 | Joy et al. | |
| 6,523,050 B1 | 2/2003 | Dhablania et al. | |
| 6,553,502 B1 | 4/2003 | Hurd et al. | |
| 6,564,328 B1 | 5/2003 | Grochowski et al. | |
| 6,564,332 B1* | 5/2003 | Nguyen et al. | 713/340 |
| 6,567,839 B1 | 5/2003 | Borkenhagen et al. | |
| 6,594,681 B1 | 7/2003 | Prabhu | |
| 6,625,654 B1 | 9/2003 | Wolrich et al. | |
| 6,629,236 B1 | 9/2003 | Aipperspach et al. | |
| 6,629,237 B2 | 9/2003 | Wolrich et al. | |
| 6,668,308 B2 | 12/2003 | Barroso et al. | |
| 6,668,317 B1 | 12/2003 | Bernstein et al. | |
| 6,671,827 B2 | 12/2003 | Guilford et al. | |
| 6,681,345 B1 | 1/2004 | Storino et al. | |
| 6,687,838 B2 | 2/2004 | Orenstien et al. | |
| 6,694,347 B2 | 2/2004 | Joy et al. | |
| 6,694,425 B1 | 2/2004 | Eickemeyer | |
| 6,697,935 B1 | 2/2004 | Borkenhagen et al. | |
| 6,728,845 B2 | 4/2004 | Adiletta et al. | |
| 6,748,556 B1 | 6/2004 | Storino et al. | |
| 6,801,997 B2 | 10/2004 | Joy et al. | |
| 6,820,107 B1 | 11/2004 | Kawai et al. | |
| 6,826,704 B1* | 11/2004 | Pickett | 713/320 |
| 6,847,985 B1 | 1/2005 | Gupta et al. | |
| 6,857,064 B2 | 2/2005 | Smith et al. | |
| 6,883,107 B2 | 4/2005 | Rodgers et al. | |
| 6,889,319 B1 | 5/2005 | Rodgers et al. | |
| 6,898,694 B2 | 5/2005 | Kottapalli et al. | |
| 7,028,165 B2* | 4/2006 | Roth et al. | 712/216 |
| 2001/0003207 A1 | 6/2001 | Kling et al. | |
| 2002/0083353 A1 | 6/2002 | Orenstein et al. | |
| 2002/0103991 A1* | 8/2002 | Overkamp et al. | 712/219 |
| 2003/0079150 A1 | 4/2003 | Smith et al. | |

OTHER PUBLICATIONS

Baniasadi et al., "Instruction Flow-Based Front-end Throttling for Power-Aware High-Performance Processors," ISLPED '01, 2001, (pp.16-21).

Tulsen et al., "Power-sensitive multithreaded architecture," IEEE 2000, pp. 199-206.

Uhrig et al., "Hardware-based power management for real-time applications," Proceedings of the Second International Symposium on Parallel and Distributed Computing, IEEE 2003, 8 pages.

Tullsen, et al., "Simultaneous Multithreading: Maximizing On-Chip Parallelism," ISCA, 1995, pp. 533-544.

Tullsen, et al., "Exploiting Choice: Instruction Fetch and Issue on an Implementable Simultaneous Multithreading Processor," pp. 191-202.

Smith, "The End of Architecture," May 29, 1990, pp. 10-17.

Alverson et al., "Tera Hardware-Software Cooperation," 16 pages.

Ungerer et al., "A Survey of Processors with Explicit Multithreading," ACM Computing Surveys, vol. 35, No. 1, Mar. 2003, pp. 29-63.

Alverson et al., "The Tera Computer System," ACM 1990, 6 pages.

Alverson et al., "Exploiting Heterogeneous Parallelism on a Multithreaded Multiprocessor," ACM 1992, pp. 188-197.

Uhrig, et al., "Implementing Real-Time Scheduling Within A Multithreaded Java Microcontroller," 8 pages.

Ide, et al., "A 320-MFLOPS CMOS Floating-Point Processing Unit for Superscalar Processors," IEEE, 1993, 5 pages.

Nemawarkar, et al., "Latency Tolerance: A Metric for Performance Analysis of Multithreaded Architectures," IEEE, 1997, pp. 227-232.

Baniasadi, et al., "Instruction Flow-Based Front-end Throttling for Power-Aware High-Performance Processors," ACM 2001, pp. 16-21.

Gura, et al., "An End-to-End Systems Approach to Elliptic Curve Cryptography," 16 pages.

Eberle, et al., "Cryptographic Processor for Arbitrary Elliptic Curves over $GF(2^m)$," 11 pages.

Amirali Baniasadi, et al., "Instruction Flow-Based Front-End Throttling for Power-Aware High-Performance Processors," Aug. 6-7, 2002, IEEE.

* cited by examiner

To/from crossbar

| | 0 | 1 | 2 | 3 | 4 | 5 | 6 | 7 |
|---|---|---|---|---|---|---|---|---|
| Fetch (F) | T0 | T3 | T6 | T2 | T7 | T5 | T1 | T4 |
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |
| Execution cycle | | | | | | | | |

FIG. 3

METHOD AND APPARATUS FOR POWER THROTTLING IN A MULTI-THREAD PROCESSOR

BACKGROUND OF THE INVENTION

1. Field of the Invention

This invention relates to computer systems, and more particularly, to power conservation in computer system processors.

2. Description of the Related Art

Modern computer system processors consume a significant amount of power. It is not uncommon for the current consumption of a modern processor to exceed 100 amperes. Thus, such a processor may easily consume in excess of 100 watts of power even at system voltages as low as one volt. High power consumption can generate large amounts of heat, which if left unchecked, can adversely affect the operation of the processor and the computer system in which it is implemented. Thus, high power consumption and the potential for excess heat generation place significant engineering demands on the design of computer systems.

Various methods of power conservation are employed in computer systems. In many computers, various system components that are inactive may be powered down for the duration of their inactivity. In many computer systems, processors are only powered down when the entire system is in an idle state. Some processors may allow for the powering down of individual processor units (e.g., a bus interface unit) if the unit is inactive. However, the core of a processor typically cannot be powered down during system activity. The current consumed by the core of a processor may account for a large amount of its overall current consumption. Furthermore, activity in the core typically affects other units within the processor, and often times the entire computer system, and thus serves as a major driver of overall power consumption.

SUMMARY

A method and apparatus for controlling power consumption in a processor is disclosed. In one embodiment, a processor includes a pipeline. The pipeline includes logic for fetching instructions, issuing instructions, and executing instructions. The processor also includes a power management unit. The power management unit is configured to input M stalls into the pipeline every N instruction cycles (where M and N are integer values and wherein M is less than N). The introduction of a stall into the pipeline may cause the state of various logic circuits within the pipeline to remain the same for an instruction cycle corresponding to the stall. Power is conserved when the logic circuits do not switch states during the stalled instruction cycle.

In one embodiment, the processor may be a multi-threaded processor. The processor may input the M stalls into the pipeline for a first thread, while inputting Y stalls into the pipeline for a second thread. As with M, Y is also an integer value that is less than N. In some situations, M and Y may be of the same value. Stalls may be input into the pipeline on the same instruction cycle(s) for each of the threads, or may be input on different instruction cycles. The values of M and Y may also be different.

The stalls may be input into the pipeline at various points. For example, stalls may be input into an instruction fetch unit, an instruction pick unit, or an instruction decode unit. In general, stalls may be input into any pipeline stage that can stall the pipeline for an instruction cycle.

The number of stalls (M and/or Y) for every N instruction cycles may be determined by various inputs into the power management unit. Such inputs may include power consumption, temperature, a targeted instructions-per-cycle value, or a pre-set value by application software. In multi-core processor embodiments, the method may be performed for each of the processor cores.

BRIEF DESCRIPTION OF THE DRAWINGS

Other aspects of the invention will become apparent upon reading the following detailed description and upon reference to the accompanying drawings in which:

FIG. 3 a pipeline diagram illustrating the flow of instructions through one embodiment of a processor core;

Figure 1:
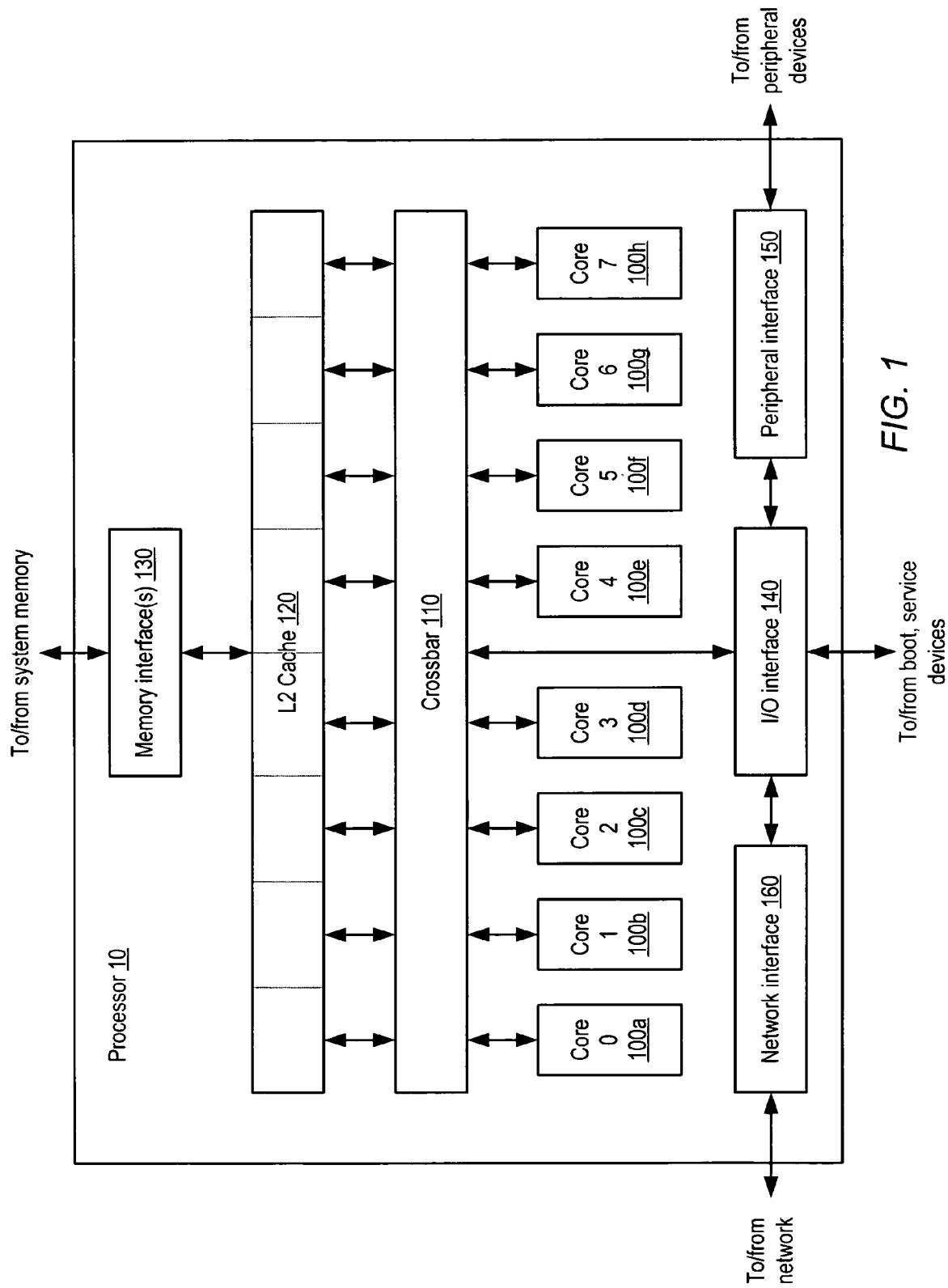
FIG. 1 is a block diagram illustrating one embodiment of a multithreaded processor.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF EMBODIMENTS

Overview of Multithreaded Processor Architecture

A block diagram illustrating one embodiment of a multithreaded processor 10 is shown in FIG. 1. In the illustrated embodiment, processor 10 includes a plurality of processor cores 100*a-h*, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses).

In either case, L2 cache 120 may implement arbitration logic to prioritize cache access among various cache read and write requestors.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI Express™), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

Overview of Fine-Grained Multithreading Processor Core

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

Figure 2:
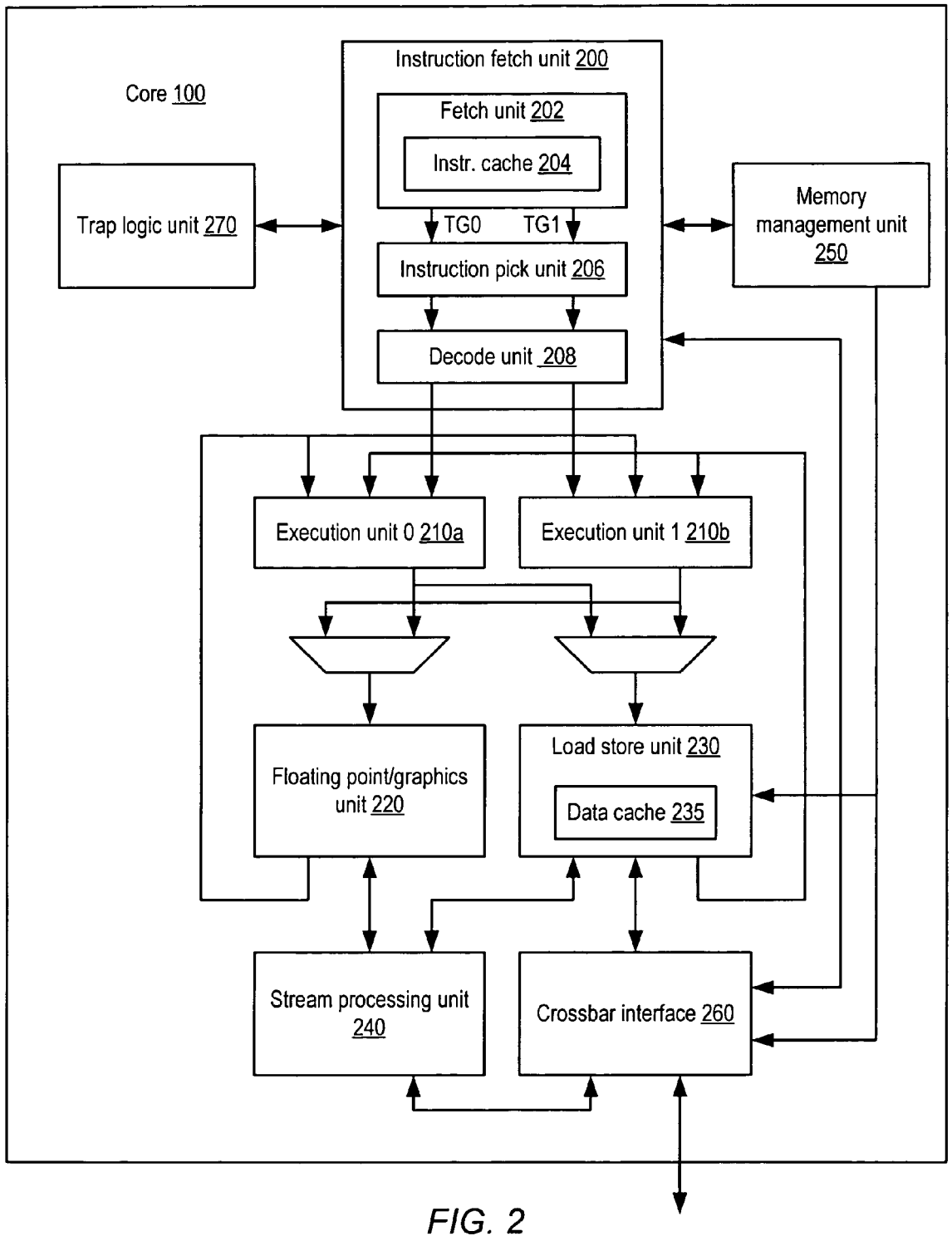
FIG. 2 is a block diagram illustrating one embodiment of a processor core configured to perform fine-grained multi-threading.

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210a-b. (Execution units 210a-b may also be referred to generically as EXUs 210.) Each of execution units 210a-b is coupled to both a floating point/graphics unit (FGU) 220 and a load store unit (LSU) 230. Each of the latter units is also coupled to send data back to each of execution units 210a-b. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 202 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently-fetched instructions from the corresponding thread may be stored. In one embodiment, instruction pick unit 206 may be configured to select one or more instructions to be decoded and issued to execution units 210.

In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single-and double-precision floating-point arithmetic instructions compliant with the IEEE 754 floating-point standard, such as add, subtract, multiply, divide, and certain transcendental functions. Also, in one embodiment FGU 220 may implement partitioned-arithmetic and graphics-oriented instructions defined by a version of the SPARC® Visual Instruction Set (VIS™) architecture, such as VIS™ 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands via control registers accessible via software; in the illustrated embodiment SPU 240 may access such control registers via LSU 230. In another embodiment SPU 240 may receive operations and operands decoded and issued from the instruction stream by IFU 200. In some embodiments, SPU 240 may be configured to freely schedule operations across its various algorithmic subunits independent of other functional unit activity. Additionally, SPU 240 may be configured to generate memory load and store activity. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requesters. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program) order complete or update architectural state.

Exemplary Core Pipeline Diagram

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

Power Management Using Processor Throttling

Figure 4:
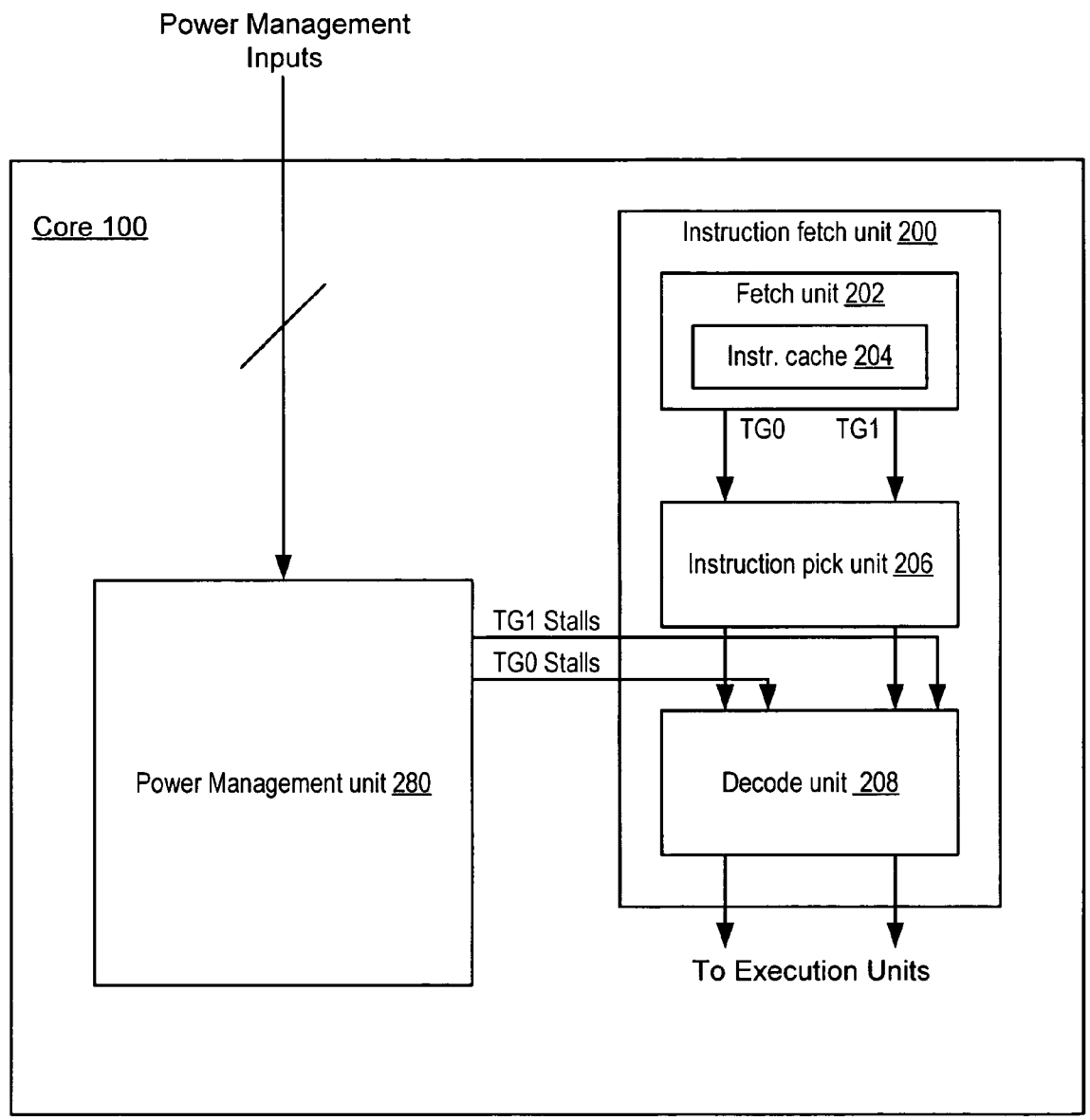
FIG. 4 is a block diagram of a portion of one embodiment of a processor core having a power management unit.

Turning now to FIG. 4, a block diagram of a portion of one embodiment of a processor core having a power management unit is shown. Processor core 100 may be similar to one of processor cores 100a-100h as discussed above, or may be a different type of processor core.

In the embodiment shown, processor core 100 includes a power management unit 280. Power management unit 280 may be configured to input stalls into the processor pipeline in order to conserve power. When a stall is input, various logic circuits in the processor core will not switch for a cycle corresponding to the stall input. The stall may propagate down the processor pipeline as a bubble in the pipeline. Since the switching of logic circuits consumes power, preventing such circuits from switching during a given instruction cycle may reduce the power consumed for that cycle. In one embodiment, power management unit 280 is configured to input M stalls into the pipeline every N instruction cycles (where M and N are both integers, and where M is less than or equal to N). For example, power management unit 280 may input 1 stall (M=1, N=8) for every 8 instruction cycles or 7 stalls for every 8 instruction cycles (M=7, N=8). In instances when controlling the power consumption is not desired, power management unit 280 may be inhibited from inputting stalls into the pipeline (i.e. M=0). In general, N can be any integer value, while M can range from any value from 0 to N. In some embodiments, the value of M may be restricted to a range of 0 to N−1. However, in other embodiments M can be any value up to N, which may allow the processor core to be stalled for an amount of time when it may not be in use.

Power management unit 280, in this embodiment, is coupled to input stalls into decode unit 208 (which may be similar to the decode unit discussed above in reference to FIG. 2). In alternate embodiments, power management unit 280 may be coupled to input stalls into instruction pick unit 206 or instruction fetch unit 202. Broadly speaking, power management unit may be coupled to input stalls into the pipeline at any stage in which the stall will prevent the switching of logic circuits, both upstream and downstream.

Processor core 100 may be a multi-threaded processor core configured to execute multiple instruction threads. In such embodiments, power management unit 280 may be configured to input stalls into the pipeline on a per-thread basis. In the embodiment shown, processor core 100 is configured to independently process instructions from two different thread groups, thread group 0 (TG0) and thread group 1 (TG1). Embodiments of power management unit 280 configured for single-thread processors or multi-threaded processors configured to process more than two threads are possible and contemplated.

In one embodiment, power management unit 280 is coupled to input stalls into the pipeline for TG0 and TG1 independently of each other. Since power management unit 280 may input stalls for each thread group independently of each other, the values of M for each thread group may be different. For example, power management unit may, in one instance, input 1 stall per 8 instruction cycles for TG0 (M=1, N=8) while inputting 3 stalls per 8 instruction cycles for TG1 (M=3, N=8). Furthermore, even if the value of M is the same for both thread groups, power management unit 280 may input stalls for the first thread group on different ones of the instruction cycles than for the second thread group. For example, if M=1 for both TG0 and TG1, power management unit 280 may input a stall on the first of every N instruction cycles for TG0 while inputting a stall on the fourth of every N instruction cycles for TG1.

Power management unit 280 is coupled to receive one or more power management inputs. The power management inputs may be used as a basis for adjusting the number of stalls M that are input into the pipeline for every N instruction cycles. The number of stalls M may be adjusted based on inputs including (but not limited to) a target instructions-per-cycle value, processor temperature, processor power consumption, or a preset value of M. It should be noted that the value of M may be adjusted during the operation of the processor, although it may also be set to a static value in some cases. Power management inputs will be discussed in more detail below in reference to FIG. 6.

Figure 5:
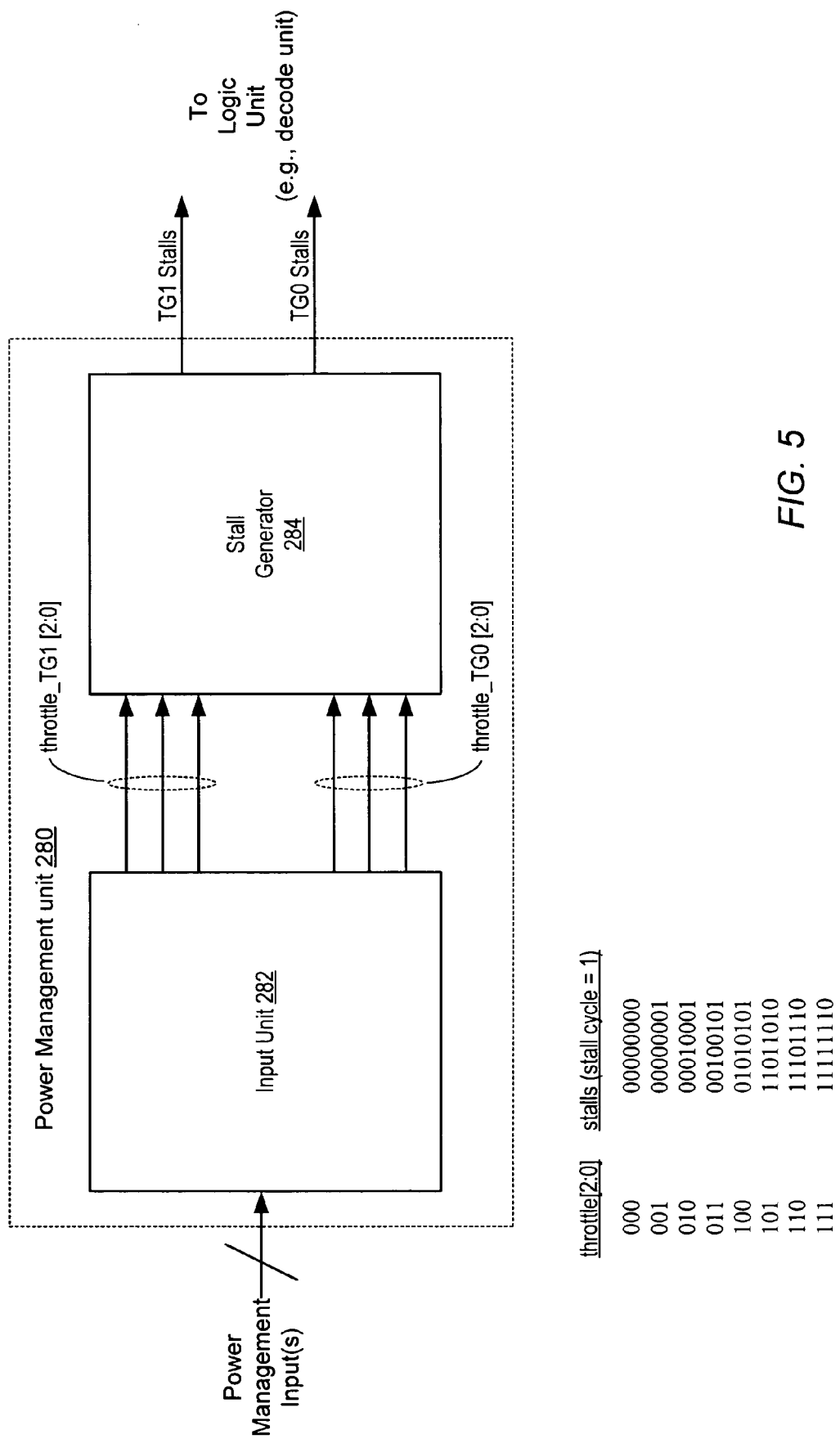
FIG. 5 is a block diagram of one embodiment of a power management unit.

FIG. 5 is a block diagram of one embodiment of a power management unit. In the embodiment shown, power management unit 280 includes input unit 282 and stall generator 284. Input unit 282 may be coupled to provide throttle signals for two separate thread groups to stall generator 284, although embodiments configured to generate stalls for a single thread, a number of threads greater than two, or a pattern of stalls to be applied across all threads are also possible and contemplated.

Based on the power management inputs received, input unit 282 is configured to generate throttling signals to be conveyed to stall generator 284. In this particular embodiment, input unit generates anywhere from 0 to 7 stalls for each 8 (i.e. N=8) instruction cycles for two separate thread groups. Since N=8 in this embodiment, the throttling signals include 3 bits each. The table shown in FIG. 5 illustrates possible stall patterns for each 8 instruction cycles based on different states of the throttling signals.

Stall generator 284 is coupled to receive the throttling signals from input unit 282. Stalls are conveyed into the pipeline by stall generator 284 based on the received throttling signals. For the embodiment shown, stalls are input into the pipeline for two different thread groups, independently of each other. Since the stalls are input independently for each of the thread groups, different values of M may be provided to stall generator 284. Furthermore, even if the values of M are the same, stalls for thread group 0 may be input on different ones of the N cycles than the stalls that are input for thread group 1.

Stalls conveyed by stall generator 284 may be received by a logic unit in the processor pipeline. The logic unit may be any unit in the pipeline that can cause the pipeline to stall (e.g., no logic switching) for an instruction cycle. As noted above, such logic units may include the decode unit, the instruction pick unit, or the fetch unit, although the inputting of stalls to other logic units in a processor pipeline is possible and contemplated.

Figure 6:
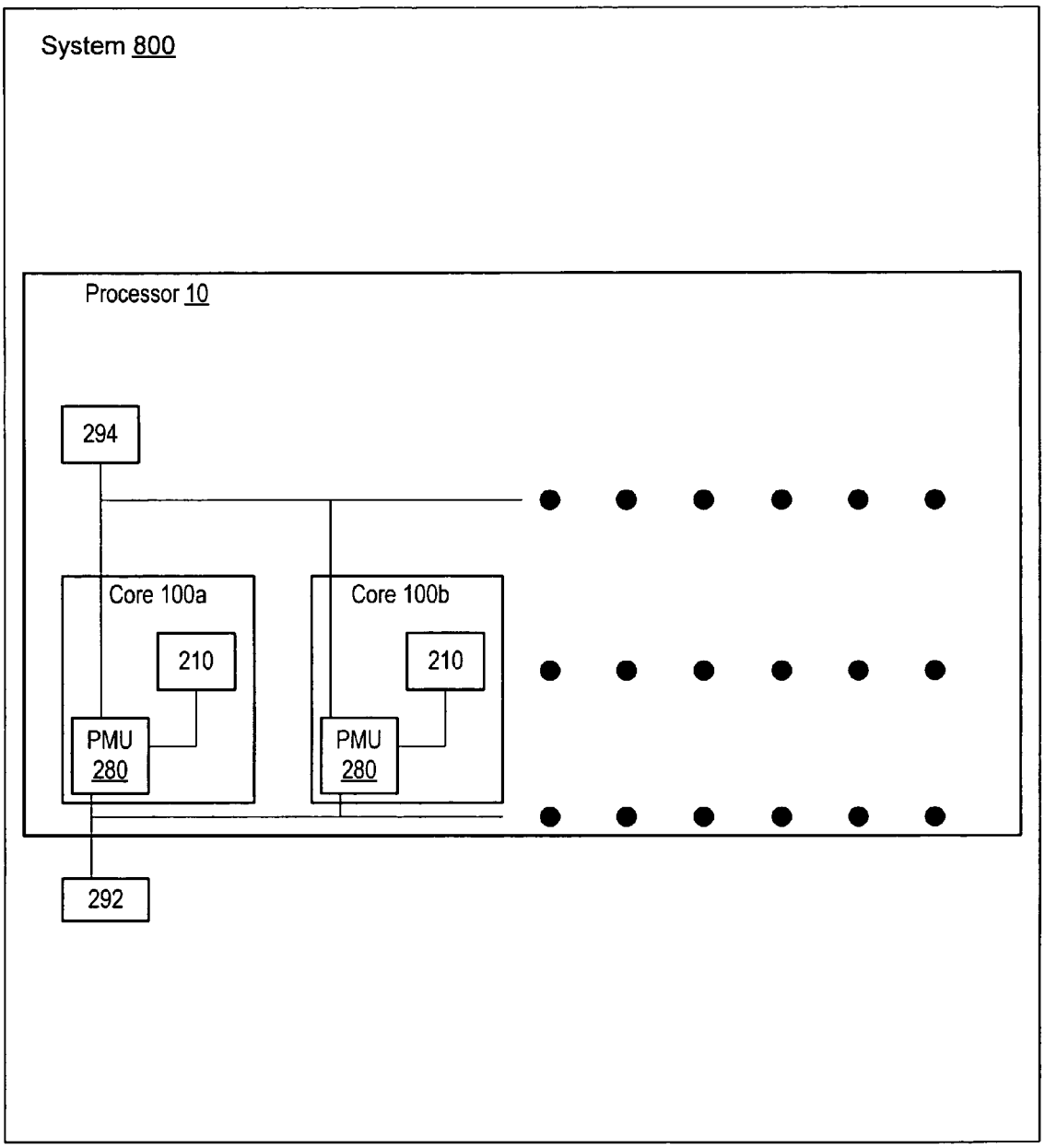
FIG. 6 is a block diagram illustrating a portion of one embodiment of a computer system, wherein the processor is configured to receive power management inputs for throttling processor cores.

Moving now to FIG. 6, a block diagram illustrating a portion of one embodiment of a computer system, wherein the processor is configured to receive power management inputs for throttling processor cores is shown. Computer system 800 includes processor 10. In this embodiment, processor 10 may include multiple cores, such as the processor in FIG. 1, with each core including a power management unit 280 such as that discussed above in reference to FIG. 4 and FIG. 5. It should be noted that embodiments wherein power management unit 280 is implemented in a single-core processor are possible and contemplated.

In the embodiment shown, each power management unit 280 is coupled to receive various power management inputs, which can be used to provide a basis for determining the rate at which stalls are input into a pipeline of the respective processor core 100. For example, system 800 includes power measurement unit 292, which is configured to measure the amount of power consumed by processor 10. Power measurement unit 292 may provide measured values of power consumption to the power measurement unit(s) 280 of each core implemented in processor 10. Each of the power management units 280 may in turn throttle their respective cores by inputting stalls (as discussed above) in order to meet power consumption targets. Power measurement unit 292 may measure power using various techniques, such as measuring current consumed by processor 10 and determining power based on the consumed current and the processor voltage.

Each of the power management units 280 implemented in a core may also be coupled to a temperature measurement unit 294 in processor 10. Temperature measurement unit 294 is coupled to provide a temperature input that may be used as a basis for determining a rate at which stalls are input to a respective processor core 100. In this particular embodiment, only a single temperature measurement unit 294 is shown, although embodiments having multiple instances of a temperature measurement unit are possible and contemplated. For example, processors having multiple cores with a dedicated temperature measurement unit for each core are possible and contemplated.

Each power management unit 280 in the embodiment shown is coupled to an execution unit 210 of its respective core 100. Each execution unit 210 may actually comprise multiple execution units, as shown in the embodiment of FIG. 2. The input provided by the execution units 210 to an associated power management unit 280 may be used to provide an instructions-per-cycle count; that is, the average number of instructions that are being executed each cycle. The instructions-per-cycle count may be determined in various ways, such as providing a counter that is toggled each time an instruction is executed in either the execution units 210 or in power management units 280. The instruction-per-cycle count may be used as a basis for adjusting the rate at which stalls are input into a pipeline of each of the cores. For example, in embodiments having two execution units per core, a maximum of two instructions-per-cycle may be executed. If it is desired to limit processor power consumption by limiting the processor to an execution rate of one instruction-per-cycle, each power management unit 280 may input stalls into a respective pipeline in order to meet this target.

Other methods of determining the rate at which stalls are input into a pipeline are also possible and contemplated. For example, a software application executing on processor 10 may preset a value for the rate at which stalls are input into a processor pipeline. This may be particularly useful for software programs that may require a low instruction-per-cycle counts.

The various parameters used by a power management input 280 may be combined in order to determine a rate at which stalls are input into a pipeline. For example, a power management unit may set limits for temperature, power consumption, and a maximum instructions-per-cycle count, and may increase the number of stalls M input for each N instruction cycles if any one of these parameters is exceeded. The parameters may be used to set minimums as well, wherein if the parameter falls below one or more of these minimums a power management unit 280 responds by lowering the rate at which stalls are input into its respective pipeline.

Figure 7:
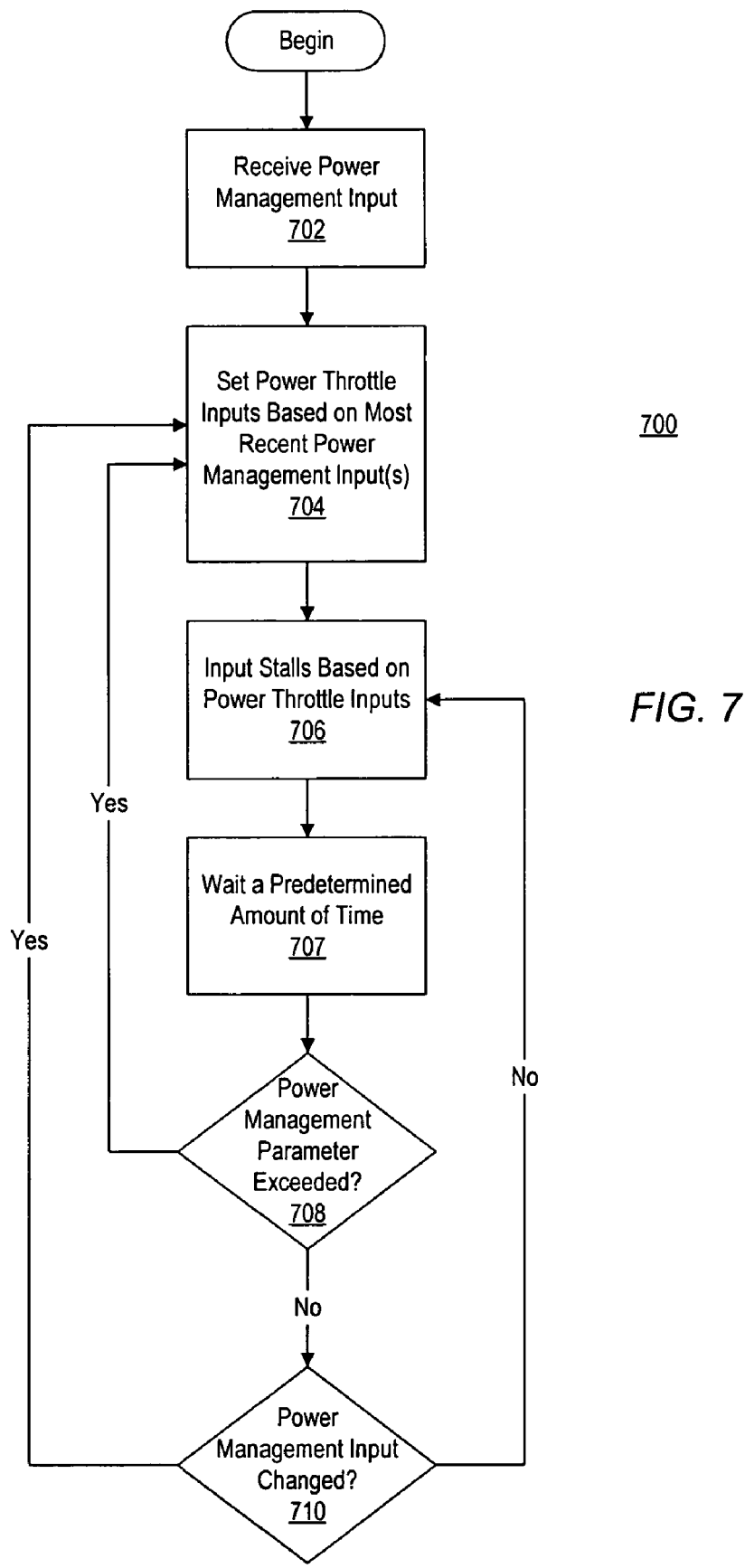
FIG. 7 is a flow diagram of one embodiment of a method for throttling a processor core.

FIG. 7 is a flow diagram of one embodiment of a method for throttling a processor core. In the embodiment shown, method 700 begins with a power management unit (such as one of the embodiments discussed above) receiving at least one power management input (702). Power throttle input signals may be based on the received power management input(s) (704). The power throttle input signals are used to determine the number of stalls M input into a pipeline for every N instruction cycles. In processors which are configured for multithreaded execution, a number of stalls M may be determined separately for each thread group. As the processor executes instructions, stalls are input into the pipeline based on the power throttle input signals (706).

After a predetermined amount of time (707), in one embodiment, the number of stalls M input into a pipeline for a given thread group may change during the course of processor operation. One instance in which a change in the number of stalls M input into a pipeline is effected is when a power management parameter is exceeded (708), or falls outside limits set within a power management unit. For example, if a power management unit is inputting 2 stalls per every 8 instruction cycles and a temperature limit is exceeded, the power management unit may respond by setting the power throttle inputs to cause 3 or more stalls to be input into the pipeline for every 8 instruction cycles. Another possible cause of a change in the number of stalls input into the pipeline may be a change in a power management input parameter (710). For example, if a processor is consuming 110 watts of power, a change of an power management input based on power consumption which sets a limit of 100 watts of power may result in an increase of the number of stalls input into a pipeline for each core of the processor. In both 708 and 710, a 'yes' answer returns the method to 704, where the power throttle inputs are adjusted to correspond to the required change.

Exemplary System Embodiment

Figure 8:
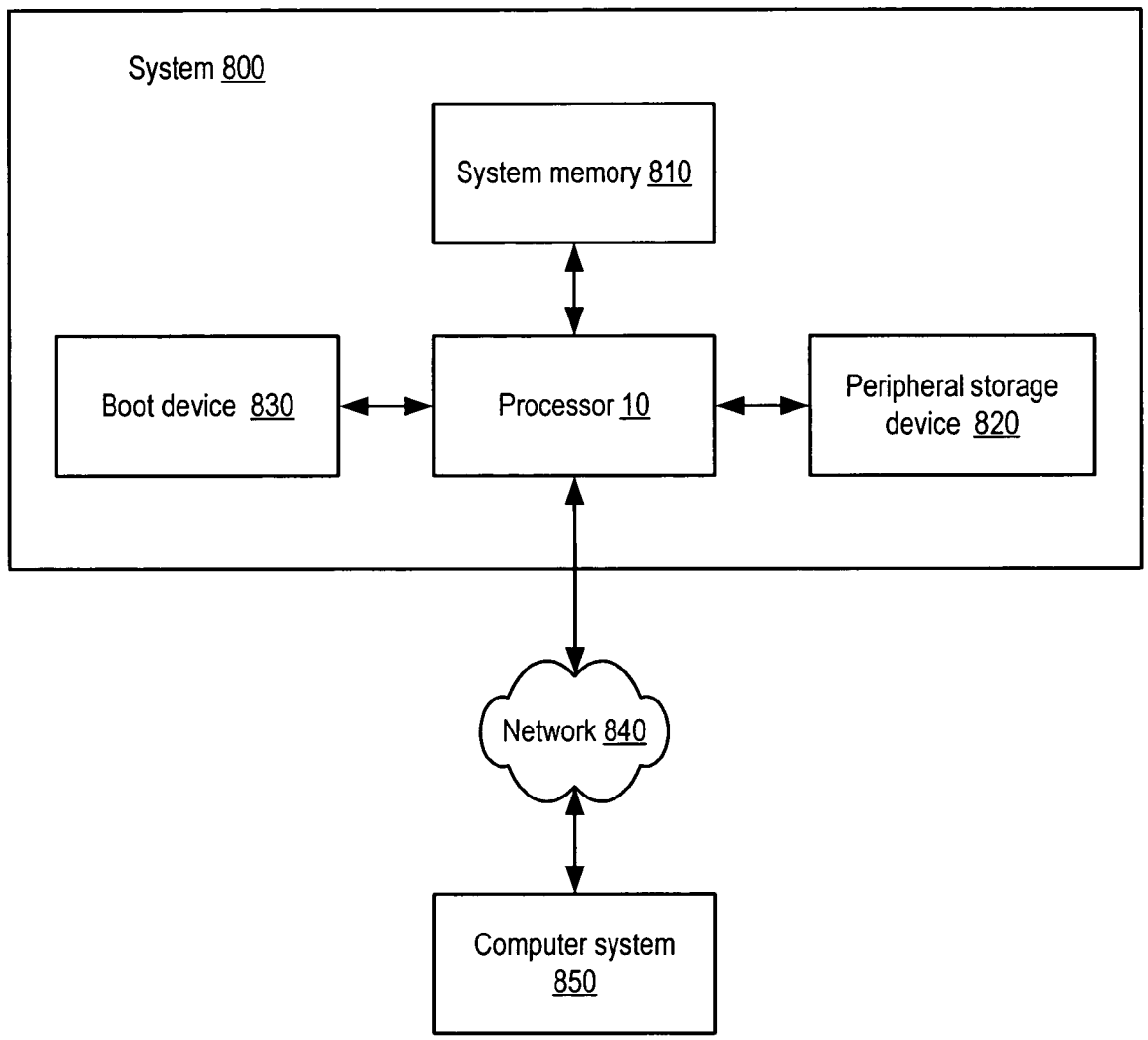
FIG. 8 is a block diagram illustrating one embodiment of a system including a multithreaded processor.

As described above, in some embodiments processor 10 of FIG. 1 may be configured to interface with a number of external devices. One embodiment of a system including processor 10 is illustrated in FIG. 8. In the illustrated embodiment, system 800 includes an instance of processor 10 coupled to a system memory 810, a peripheral storage device 820 and a boot device 830. System 800 is coupled to a network 840, which is in turn coupled to another computer system 850. In some embodiments, system 800 may include more than one instance of the devices shown, such as more than one processor 10, for example. In various embodiments, system 800 may be configured as a rack-mountable server system, a standalone system, or in any other suitable form factor. In some embodiments, system 800 may be configured as a client system rather than a server system.

In various embodiments, system memory 810 may comprise any suitable type of system memory as described above, such as FB-DIMM, DDR/DDR2 SDRAM, or RDRAM®, for example. System memory 810 may include multiple discrete banks of memory controlled by discrete memory interfaces in embodiments of processor 10 configured to provide multiple memory interfaces 130. Also, in some embodiments system memory 810 may include multiple different types of memory.

Peripheral storage device 820, in various embodiments, may include support for magnetic, optical, or solid-state storage media such as hard drives, optical disks, nonvolatile RAM devices, etc. In some embodiments, peripheral storage device 820 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 830 may include a device such as an FPGA or ASIC configured to coordinate initialization and boot of processor 10, such as from a power-on reset state. Additionally, in some embodiments boot device 830 may include a secondary computer system configured to allow access to administrative functions such as debug or test modes of processor 10.

Network 840 may include any suitable devices, media and/or protocol for interconnecting computer systems, such as wired or wireless Ethernet, for example. In various embodiments, network 840 may include local area networks (LANs), wide area networks (WANs), telecommunication networks, or other suitable types of networks. In some embodiments, computer system 850 may be similar to or identical in configuration to illustrated system 800, whereas in other embodiments, computer system 850 may be substantially differently configured. For example, computer system 850 may be a server system, a processor-based client system, a stateless "thin" client system, a mobile device, etc.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A method for controlling power consumption in a processor, the method comprising:
   fetching instructions to be executed in a processor pipeline;
   issuing the instructions to be executed in the processor pipeline;
   executing the instructions in the processor pipeline; and
   inputting M stalls into the pipeline for every N instruction cycles based on a power management input, wherein M and N are integer values and wherein M is less than N.

2. The method as recited in claim 1, wherein the M stalls are input into a decode unit in the processor pipeline.

3. The method as recited in claim 1, wherein the M stalls are input into an instruction fetch unit in the processor pipeline.

4. The method as recited in claim 1, wherein the M stalls are input into an instruction pick unit in the processor pipeline.

5. The method as recited in claim 1, wherein said fetching, said issuing, said executing, and said inputting is performed for instructions of a first thread group in the processor pipeline, and wherein the method further comprises:
   fetching instructions of a second thread group to be executed in a processor pipeline;
   issuing the instructions of the second thread group to be executed in the processor pipeline;
   executing the instructions of the second thread group in the processor pipeline; and
   inputting Y stalls into the pipeline for every N instruction cycles for the second thread group, wherein Y and N are integer values and wherein M is less than N.

6. The method as recited in claim 5, wherein values of M and Y are different.

7. The method as recited in claim 5, wherein values of M and Y are the same, and wherein stalls for the first and second thread groups are input on different ones of the N instruction cycles with respect to each other.

8. The method as recited in claim 1, wherein the power management input is power consumption, and wherein a value of M is adjusted based on said power consumption.

9. The method as recited in claim 8, wherein the power consumption is determined by a current measurement.

10. The method as recited in claim 1, wherein the power management input is a target instruction per cycle count, and wherein a value of M is adjusted based on the target instruction per cycle count.

11. The method as recited in claim 1, wherein the power management input is a temperature measurement, and wherein a value of M is adjusted based on the temperature measurement.

12. The method as recited in claim 1, wherein the power management input is a value of M pre-set by a software application.

13. The method as recited in claim 1 further comprising a power management unit generating a plurality of signals indicating a value of M and particular ones of the N instruction cycles in which stalls are input into the processor pipeline.

14. The method as recited in claim 13, wherein the stalls are generated based on states of each of the plurality of signals.

15. The method as recited in claim 1, wherein said fetching, said issuing, said executing, and said inputting is performed for each of a plurality of cores in the processor.

16. A processor, comprising:
 a pipeline, wherein the pipeline includes:
  instruction fetch logic configured to issue instructions; and
  at least one execution unit, wherein the execution unit is coupled to receive instructions from the instruction fetch logic; and
 a power management unit, wherein the power management unit is configured to introduce M stalls into the pipeline for every N instruction cycles based on a power management input, wherein M and N are integer values and wherein M is less than N.

17. The processor as recited in claim 16, wherein the power management unit is coupled to input the M stalls into a decode unit in the instruction fetch logic.

18. The processor as recited in claim 16, wherein the power management unit is coupled to input the M stalls into an instruction pick unit in the instruction fetch logic.

19. The processor as recited in claim 16, wherein the power management unit is coupled to input the M stalls into an instruction fetch unit.

20. The processor as recited in claim 16, wherein the pipeline is configured to operate on a first thread group and a second thread group, wherein the M stalls are input into the pipeline for the first thread group, and wherein the processor is further configured to input Y stalls into the pipeline for the second thread group.

21. The processor as recited in claim 20, wherein values of M and Y are different.

22. The processor as recited in claim 20, wherein values of M and Y are the same, and wherein stalls for the first and second thread groups are input on different ones of the N instruction cycles with respect to each other.

23. The processor as recited in claim 16, wherein the power management unit is configured to adjust a value of M based on power consumption.

24. The processor as recited in claim 23, wherein the power consumption is determined by a current measurement.

25. The processor as recited in claim 16, wherein a value of M is adjusted based on a target instruction per cycle count.

26. The processor as recited in claim 16, wherein a value of M is adjusted based on a temperature measurement.

27. The processor as recited in claim 16, wherein a value of M is pre-set by a software application.

28. The processor as recited in claim 16, wherein the power management unit is configured to generate a plurality of signals indicating a value of M and particular ones of the N instruction cycles in which stalls are input into the processor pipeline.

29. The processor as recited in claim 28, wherein the stalls are generated based on states of each of the plurality of signals.

30. The processor as recited in claim 16, wherein the processor includes a plurality of cores, and wherein each of the cores includes a power management unit configured to introduce M stalls into the pipeline for every N instruction cycles, wherein M and N are integer values and wherein M is less than N.

* * * * *